_United States Patent_ [19]

Nicks

[11] 4,138,376

[45] Feb. 6, 1979

[54] COATING COMPOSITIONS

[75] Inventor: Peter F. Nicks, Maidenhead, England

[73] Assignee: Imperial Chemical Industries Limited, London, England

[21] Appl. No.: 693,227

[22] Filed: Jun. 7, 1976

[30] Foreign Application Priority Data

Jun. 13, 1975 [GB] United Kingdom ............... 25377/75

[51] Int. Cl.$^2$ .......................... C09D 3/72; C09D 5/02
[52] U.S. Cl. ...................... 260/22 TN; 260/31.8 XA; 260/33.6 UB; 260/858
[58] Field of Search .................. 260/22 TN, 31.8 XA, 260/33.6 UB, 858

[56] References Cited

U.S. PATENT DOCUMENTS

| | | | |
|---|---|---|---|
| 3,012,987 | 12/1961 | Ansul | 260/858 |
| 3,114,734 | 12/1963 | Gobran et al. | 260/22 TN |
| 3,271,352 | 9/1966 | Weinberg | 260/858 |
| 3,284,539 | 11/1966 | McElroy | 260/858 |
| 3,316,189 | 4/1967 | Adams | 260/33.6 UB |
| 3,433,753 | 3/1969 | Farkas et al. | 260/33.6 UB |
| 3,660,355 | 5/1972 | Johnson et al. | 260/29.7 H |
| 3,748,294 | 7/1973 | Kershaw et al. | 260/22 TN |
| 3,786,010 | 1/1974 | Tsugukuni et al. | 260/22 CQ |
| 3,804,787 | 4/1974 | Nicks et al. | 260/22 CB |
| 3,810,855 | 5/1974 | Tugukuni et al. | 260/22 TN |
| 3,909,466 | 9/1975 | Matsui et al. | 260/858 |
| 3,917,741 | 11/1975 | McGarr | 260/858 |
| 3,920,595 | 11/1975 | Anderson et al. | 260/22 TN |
| 3,920,597 | 11/1975 | Nicks et al. | 260/22 R |
| 3,926,875 | 12/1975 | Tsugukuni et al. | 260/22 TN |
| 3,981,947 | 9/1976 | Kaufman et al. | 260/33.6 UB |
| 4,000,218 | 12/1976 | Critchfield et al. | 260/33.6 UB |
| 4,026,850 | 5/1977 | Frank et al. | 260/33.6 UB |

FOREIGN PATENT DOCUMENTS 7226657  7/1972  Japan ................... 260/22 TN

_Primary Examiner_—Ronald W. Griffin
_Attorney, Agent, or Firm_—Cushman, Darby & Cushman

[57] ABSTRACT

Coating compositions comprise a blend of (1) a dispersion in an organic liquid comprising a major proportion of aliphatic hydrocarbon of particles of a polyisocyanate or adduct thereof insoluble in the organic liquid the dispersion being stabilized by a defined polymeric stabilizer and, (2) a solution in a solvent comprising a major proportion of aliphatic hydrocarbon of a material containing groups which are reactive with isocyanate groups contained in or yielded by the polyisocyanate of the dispersion.

13 Claims, No Drawings

COATING COMPOSITIONS

This invention relates to coating compositions which comprise one component containing or capable of yielding isocyanate groups and another component containing groups which are reactive with isocyanate groups; and also to coatings obtained therefrom.

Coating compositions which are known to yield useful coatings may comprise (a) a solution of one component which contains or is capable of yielding isocyanate groups (hereafter this component is termed a polyisocyanate) and (b) a solution of another component which contains certain isocyanate-reactive groups, the solutions (a) and (b) being mixed shortly before application to a substrate whereby the isocyanate and isocyanate-reactive groups are able to co-react. The polyisocyanate component of these known compositions is usually an adduct or a prepolymer of a diisocyanate which must be dissolved to form a solution in solvents such as aromatic hydrocarbons and esters or mixtures thereof and, necessarily, the component containing isocyanate-reactive groups must be soluble in and must be dissolved to form a solution in one of these solvents or another miscible solvent in order to achieve a satisfactory coating from the mixture of the two solutions. Since the use of aromatic hydrocarbons, esters and related solvents may be hazardous, particularly under conditions of poor ventilation, there has been a need for a two-component coating composition of this general type which is essentially based on a comparitively innocuous volatile liquid, for example aliphatic hydrocarbon.

We have now found surprisingly that two-component coating compositions of the general type mentioned above can be based on a volatile aliphatic hydrocarbon when the polyisocyanate component is used in the form of a specific stabilised dispersion and according to this invention we provide a coating composition which comprises a blend of:

(1) a dispersion in an organic liquid comprising a major proportion of aliphatic hydrocarbon of particles of a polyisocyanate insoluble in the organic liquid, the dispersion being stabilised by a polymeric stabiliser one component of which is soluble in the organic liquid and another component of which is soluble in the disperse particles each component having a molecular weight of at least 500, and preferably at least 1,000, and the ratio of the total molecular weights of the individual components of the two types being in the range 3:1 to 1:3, and (2) a solution in a solvent comprising a major proportion of aliphatic hydrocarbon of a material containing groups which are reactive with the isocyanate groups contained in or yielded by the polyisocyanate of the dispersion (1).

Suitable groups reactive with an isocyanate group include for example, hydroxyl, primary and secondary amino, carboxyl and mercapto groups.

The coating composition may also comprise, for example, a catalyst for the reaction of the isocyanate groups with the isocyanate-reactive groups and any other conventional coating composition constituent, for example pigment, filler, thickener and additional organic liquids.

The new compositions overcome the disadvantages of toxicity associated with the solvents used in the known compositions; the equipment used in applying the new compositions may be cleaned with readily available innocuous solvents; and the use of the dispersion (1) permits the formulation of compositions having a higher content of polyisocyanate than is possible as a solution. The compositions are particularly suitable for application where efficient ventilation may not be available yet where the advantages of an isocyanate-type coating is desired. It is a further feature of the invention that such coatings may be obtained by a non-autoxidative process, i.e., in the absence of metal driers.

According to a further feature of this invention we provide coatings which are produced from the coating compositions herein described.

The disperse particles of polyisocyanate may be liquid or solid at normal ambient temperatures. In general they will be liquid at these temperatures in order to facilitate their reaction with the isocyanate-reactive groups but they may be liquid only at elevated temperatures when the reaction is to take place at these elevated temperatures. The disperse particles may also comprise a liquid or solid other than the polyisocyanate, for example a solvent for the polyisocyanate, a catalyst, pigment or other suitable additive.

The polyisocyanate is preferably in the form of an adduct or prepolymer which is insoluble in a liquid comprising a major proportion of aliphatic hydrocarbon. Suitable polyisocyanates include the adducts or prepolymers of those free aliphatic and aromatic di- and tri-isocyanates which are already known to be useful in the preparation of coatings and which are insoluble in organic liquids comprising a major proportion of aliphatic hydrocarbon, for example m- and p-phenylene diisocyanates, 2,4- and 2,6- toluylene diisocyanates and mixtures thereof, 4,4'- and 2,4' -diisocyanato-diphenylmethane or mixtures thereof, 4,4' -diisocyanato - 2,2' -diphenyl propane, tetramethylene- 1,4 -diisocyanate, dicyclo hexylmethane diisocyanate, and isophorone diisocyanate. Preferably the polyisocyanate is in the form of a prepolymer or adduct wherein a free polyisocyanate, for example those already mentioned, is at least partially reacted with a hydroxyl group-containing compound, for example water, trimethylol propane, glycerol, or other polyol. Such prepolymer or adduct polyisocyanates are less volatile and hence are less toxic than the free diisocyanates mentioned above and they are particularly suitable for use in the coating compositions with which this invention is concerned. Particularly suitable polyisocyanates are the commercially available prepolymers prepared, for example, by reacting a mixture of 3 mols of the 2,4- and 2,6-isomers of toluylene diisocyanate with 1 mol of trimethylol propane and by reacting 3 mols of hexamethylene -1,6-diisocyanate with 1 mol of water.

Provided that the polymeric stabiliser contains the required components which are soluble in the disperse and continuous phases respectively of the dispersion of polyisocyanate the stabiliser can be of a broad chemical type. Preferably the stabiliser is a block copolymer or a graft copolymer.

Whilst the soluble components of the stabiliser should have an average molecular weight of at least 500, preferably it should be at least 1000 in order to achieve the optimum dispersion stability.

Preferably each component is of similar chemical type to or of the same chemical type as the phase in which it is to be soluble. The component soluble in the disperse polyisocyanate phase, for example, is preferably similar in chemical type to the polyisocyanate and preferably it comprises an isocyanate- or polyisocyanate- containing moiety, for example a prepolymer or adduct moiety which is linked to the other component soluble in the organic liquid of the continuous phase. The component soluble in the continuous phase comprising a major proportion of aliphatic hydrocarbon is preferably aliphatic in character, and a component soluble in this phase which is of suitable molecular weight may be prepared by poly-esterification of a hydroxyalkanoic acid, for example 12-hydroxystearic acid, or a simple ester thereof which may be polymerised to a predetermined molecular weight, for example 1,000–2,000.

Other components which are soluble in a continuous phase comprising a major proportion of aliphatic hydrocarbon include polymers of the higher alkyl (e.g. C10-18) methacrylates, poly(tertiary butyl styrene); and hydroxyl group-terminated poly(butadiene) and ' poly (oxypropylene). Components of the two types mentioned above may be linked together by simple chemical reactions, for example by a condensation reaction which form, for example:

(i) Ester links, especially when formed by ester interchange or by a carboxyl-glycidyl group reaction.
(ii) Urea links especially when formed by reacting an amine-terminated precursor with an isocyanate group.
(iii) Amide links, especially when formed by an isocyanate-carboxyl reaction.
(iv) Urethane links, especially when formed by reaction of an isocyanate with hydroxyl groups.
(v) Thiourethane links, especially when formed by reaction of mercapto and isocyanate groups.

Examples of typical polymeric stabilisers include the product of linking together a poly(12-hydroxystearic acid) of molecular weight 1,000–2,000 with a prepolymer prepared by reacting 1 mol of water with 3 mols of hexamethylene 1,6-diisocyanate (commercially available as Desmodur N).

The dispersion of the polyisocyanate in aliphatic hydrocarbon, for example of prepolymer or adduct, is made by addition of the prepolymer or adduct in a liquid form to a solution of graft or block copolymer stabiliser dissolved in the aliphatic hydrocarbon under conditions of vigorous shear. In this manner a stable emulsion is formed in which the polyisocyanate becomes the disperse phase. An alternative method of preparing the dispersion is by the in situ preparation of the stabiliser. In this case a solution in aliphatic hydrocarbon of the required quantity of a precursor for the stabiliser, i.e. an aliphatic hydrocarbon soluble polymer, is heated at, for example, 60° C. under conditions of vigorous shear together with an isocyanate prepolymer adduct. Reaction of the stabiliser precursor with the isocyanate prepolymer leads to the formation of the stabiliser and the subsequent formation of the emulsion.

The proportion of stabiliser used in the dispersion of polyisocyanate will usually be in the range 1–10% by weight based on the weight of the disperse phase and correspondingly depending also upon the manner of dispersal, the particle size of the dispersion will be in the range 10–0.1μ. Preferably the proportion of stabiliser is in the range 2–5% by weight based on the weight of the disperse phase.

The material containing groups reactive with isocyanate groups may be chosen from a wide range of aliphatic hydrocarbon — soluble materials containing for example hydroxyl, primary and secondary amino, carboxyl and mercapto groups. Examples of such materials include the aliphatic hydrocarbon — soluble polyamines, e.g. diethylene triamine, amine-terminated polyamides, and polyureas.

Preferably the material contains hydroxyl groups and may comprise a simple polyol for example, diethylene glycol 1,3-propylene glycol, 1.2.6-hexane triol, or a polymeric material for example a polyhydroxyl group-containing polyester, or an alkyd resin. Suitable polyesters include those made from succinic, adipic, maleic and phthalic acids and from diethylene glycol, 1.3-propylene glycol and hexane 1.6-diol. Suitable alkyd resins include those prepared by reacting phthalic acid, pentaerythritol, trimethylol propane and natural oils such as coconut oil and palm kernel oil.

The polyhydroxyl group-containing material may contain natural oil moieties. Preferably drying oils are absent. It is a particular advantage of the present coating compositions that they will yield hard coating films by a non-autoxidative process whilst using those innocuous and preferred diluents which are conventionally associated with the use of resins which harden to produce a coating film by an autoxidative process. These last coating films may yellow with the passage of time and generally require the use of metallic driers which may be toxic.

By an aliphatic hydrocarbon we mean a liquid comprising a straight or branched chain aliphatic hydrocarbon or mixture thereof which has a boiling point in the range 70°–220° C., for example commercially available white spirit. Other liquids which may be present with the aliphatic hydrocarbon include for example minor proportions of alkanols, glycols, glycol ethers, esters, ketones and aromatic hydrocarbons.

The relative proportions of the dispersion of polyisocyanate and of the solution of isocyanate-reactive group-containing material employed in the blend, which is prepared by conventional mixing at a suitable time prior to use, are such that the NCO:isocyanate reactive group molar ratio lies within the range 1:1 to 1:5. Preferably the range is 1:1 to 0.7:1.

The blend may contain a suitable catalyst for the reaction of the isocyanate groups, for example dibutyl tin dilaurate, in a proportion of, for example, 0.01–0.5% by weight based on the weight of isocyanate. The blend may also contain other additives for example thickeners, fillers and pigments. These additives may be incorporated with the isocyanate-reactive group-containing material before blending with the dispersion of polyisocyanate. In general the pot life of these compositions is from 1 to 10 hours.

The coating compositions of the invention can be applied to a wide variety of substrates, for example wood, metal and glass, by the usual processes, for example by brushing, spraying and dipping. They are particularly useful, for example, for application to primed and undercoated substrates where the primer or undercoat is sensitive to those strong solvents which have been used in the known two-component polyisocyanate-containing compositions. Suitable applications include the formulation of decorative, refinish and marine plants.

The invention is illustrated by the following Examples in which parts and percentage are by weight unless otherwise stated.

EXAMPLE 1

(a) Preparation of a dispersion of a polyisocyanate

A stabiliser for the dispersion was prepared as follows:

2460 parts of poly(12-hydroxystearic acid) of molecular weight 1650 (prepared by heating 12-hydroxystearic acid at 180° C. and removing water until the product had an acid value of 36.4 mg KOH/g) was reacted with 342 parts of the glycidyl ester of a tertiary C8-C10 aliphatic acid (commercially available as Cardura E) at 150° C. for 1 hour in the presence of 28 parts of C12/14 dimethyl amine (commercially available as Armeen DMCD) when the acid value was less than 1 mg KOH/g. 350 parts of the resulting hydroxy ester were added over 90 minutes to 205.5 parts of a trimer of hexamethylene diisocyanate and commercially available as a 75% solids content solution in a mixture of xylene and ethoxyethyl acetate as Desmodur N) having an isocyanate group content of 21.9% and weight average molecular weight of 4,800 as determined by gel phase chromatography and heated at 70° C. in the presence of 0.15 parts dibutyl tin dilaurate as catalyst until the isocyanate value was 4.2%. 23 parts of n-butanol were then added and heating continued to an isocyanate value of less than 0.5%.

10 parts of the copolymer prepared above were dissolved at 60° C. in 100 parts of aliphatic hydrocarbon (boiling range 150°-200° C.). 205 parts of the trimer of hexamethylene diisocyanate (referred to above) were heated to 60° C. and added to the copolymer solution with rapid stirring to produce a fine particle size stable dispersion of 50% solids content. The dispersion could be further diluted with aliphatic hydrocarbon without affecting its stability.

(b) Preparation of a coating from a blend of a dispersion of polyisocyanate and a solution of an alkyd resin 41.8 parts of alkyd resin (prepared from coconut oil, pentaerythritol, and phthalic anhydride in the molar ratio 1/1.5/2.4) of acid value 9 mg KOH/g, hydroxyl value 59 mg KOH/g and viscosity 10-15 poise (at 25° C.) as a 80% solids solution in aliphatic hydrocarbon (boiling point 150°-200° C.) was blended with 20 parts of the dispersion prepared in (a), the OH/NCO ratio of the components being 1:1. The resulting composition was spread as a coating on a non-absorbent substrate where it dried to a clear tough film in 16 hours. When 0.1% dibutyl tin laurate based on the weight of isocyanate was added to the composition a similar film was obtained in 8 hours.

(c) Preparation of a pigmented coating composition

A white millbase was prepared by dispersing 1490 parts of rutile titanium dioxide in 1068 parts of the alkyd resin solution of (b) above and 150 parts of white spirit in a ball mill for 16 hours. A further 598 parts of the alkyd solution were then added to the product and mixed therein to form the millbase. 109 parts of the millbase were well mixed with 29 parts of the alkyd resin solution of (b) and with 18 parts of the polyisocyanate dispersion of (a) and the blend applied as a coating to a nonabsorbent substrate. After drying overnight a tough glossy white film was produced. In the presence of dibutyl tin dilaurate the rate of drying was improved.

EXAMPLE 2

In this Example is described the preparation of three different dispersions, (a), (b) and (c), of polyisocyanate in aliphatic hydrocarbon. These dispersions were subsequently blended with the alkyd resin solution of Example 1 (b) (to give a OH/NCO ratio of 1/1) and produced coating films similar to those described in Example 1.

(a) The trimer of hexamethylene diisocyanate used in Example 1 (a) was substantially freed from solvent by vacuum distillation. 155 parts of the product were heated to 60° C. with a solution of 10g of copolymer as in Example 1 dissolved in 45 parts of aliphatic hydrocarbon (boiling range 150°-200° C.) to produce a stable creamy dispersion of viscosity 2.2 poise at 25° C./10,000 sec$^{-1}$ and of solids content 75%. The dispersion could be diluted with further aliphatic hydrocarbon without affecting its stability.

(b) 10 parts of the copolymer stabiliser of Example 1 (a) were dissolved in 67 parts of aliphatic hydrocarbon (boiling range 150°-200° C.) at 60° C. 133 parts of a 75% solids solution in xylene/ethoxy ethyl acetate (1/1) of a prepolymer prepared from toluene diisocyanate and trimethylol propane (commercially available as Desmodur L) were heated to 60° C. and then mixed vigorously with the copolymer solution to produce a stable dispersion at 50% solids. The dispersion could be diluted with aliphatic hydrocarbon without causing instability.

(c) Stable dispersions of mixtures of the commercially available Desmodur L and Desmodur N described above in the weight ratio 1:2, 2:1 and 1:2 respectively based on their solids contents were prepared as in Example 1(a) to give a stable dispersion of 50% solids which could be diluted with aliphatic hydrocarbon without causing instability.

EXAMPLE 3

Preparation of a coating from a blend of a polyisocyanate dispersion and a solution of an alkyd resin 26.4 parts of an alkyd resin (prepared from tall oil fatty acids, pentaerythinitol and phthalic anhydride in the molar ratio 3/2.75/2.) of acid value 3mg/KOH/g, hydroxyl value 160mg/KOH/g and a viscosity of 20 poise (at 25° C.) as a 70% solution in aliphatic hydrocarbon (boiling point 150°-200° C.) was blended with 13.2 parts of a dispersion of polyisocyanate as prepared in Example 1(a). The OH/NCO ratio of the components was 100/75. The resulting composition was spread as a coating 4 thou thick on a glass plate where it dried to a hard tough film in 16 hours. When 0.1% of dibutyl tin dilaurate based on the weight of the isocyanate was added to the composition, a similar coating dried in 4 hours.

EXAMPLE 4

(a) Preparation of polyisocyanate dispersions (1) 809 parts of an adduct (hydroxyl value 33mg/KOH/g) of a $C_{18}$ saturated alcohol reacted with 25 moles of propylene oxide were added to 100 parts of the triisocyanate derived from 1 mol of water and 3 mols of hexamethylene diisocyanate (available commercially as Desmodur N and supplied as a 75% solids solution in xylene and ethoxyethyl acetate). The isocyanate was heated at 60° C. during the addition of the hydroxylic material and held at that temperature until the "NCO" value was zero. 0.15 parts of dibutyl tin dilaurate was added as a catalyst to accelerate the OH-NCO reaction.

The reaction product was thinned with aliphatic hydrocarbon (boiling point 150°-200° C.) to give a solution of 50% solids content. 20 parts of the stabiliser thus prepared was added to 100 parts of aliphatic hydrocarbon (boiling point 150°-200° C.) and 133 parts of the polyisocyanate commercially available as Desmodur N were added with vigorously stirring. A creamy emulsion was produced which remained stable when stored in a sealed container for several months. The dispersion could be further diluted with aliphatic hydrocarbon without affecting its stability.

(2) 800 parts of the propylene oxide adduct of a $C_{18}$ saturated alcohol were blended with 134 parts of unsaturated alcohol (commercially available as HD oleyl/linolenyl alcohol 110/130 from Dehydag-Deutsche Hydrierwerke GMBH) and having a hydroxyl value of 202mg/KOH/g. The mixture was added to 200 parts of Desmodur N at 60° C. over 2 hours with stirring. 0.2 parts of dibutyl dilaurate were added as a catalyst. The reaction mixture was held at 60° C. until a sample was shown to have a zero "NCO" content and it was then thinned to 50% solids in aliphatic hydrocarbon.

10 parts of the stabiliser solution were dissolved in 100 parts of aliphatic hydrocarbon and heated to 60° C. 200 parts of Desmodur N (preheated to 60° C.) were added with vigorous stirring. A fine particle size, stable emulsion resulted.

(3) A sample of carboxy-terminated polytertiary butyl styrene was prepared by the following method:

1440 parts of butyl acetate were changed to a flask and heated with stirring to reflux. 1800 parts of tertiary butyl styrene and a solution of 54 parts of 44'azobis-4-cyano valeric acid, and 180 parts thioglycollic acid dissolved in 270 parts of butyl acetate and 570 parts of methyl "Cellosolve" were added separately but simultaneously to the flask over a period of 3 hours. The contents of the flask were refluxed until polymerisation was complete. The resulting polymer was purified by precipitation with methanol, and was redissolved in toluene until the excess unreacted thioglycollic acid was removed. The final product was dissolved in toluene to give a solution containing 48% solids. The acid value of the polymer was 20 mg/KOH/g and the molecular weight (Mn) (as determined by gel permeation chromotography) was 2780.

A stabiliser precursor was prepared by reacting 1000 parts of the 48% solids solution of polytertiary butyl styrene with 93 parts of the glycidyl ester of a tertiary $C_8$–$C_{10}$ aliphatic acid (commercially available as Cardura E) at 150° C. for 1 hour in the presence of 6 parts of a $C_{12/14}$ dimethyl tertiary amine (commercially available as Armeen DMCD) when the acid value was less than 1mgKOH/g.

2500 parts of the resulting hydroxy ester were added to 180 parts of the triisocyanate (Desmodur N at 75% solids) at 60° C. and held at that temperature until the product had a zero "NCO" content. The toluene was removed by vacuum distillation and replaced by aliphatic hydrocarbon (boiling range 150°–200° C.) to give a solution at 50% solids.

10 parts of this stabiliser were dissolved in 100 parts of aliphatic hydrocarbon (boiling range 150°–200° C.) and heated to 60° C. 133 parts of Desmodur N were added with vigorous stirring. A fine particle size emulsion resulted which remained stable over several months.

(b) Preparation of coatings from a blend of polyisocyanate dispersion and solution of alkyd resin The polyisocyanate dispersions prepared in (1), (2) and (3) above were blended separately with appropriate amounts of the solutions of alkyd resins described in Examples 1(b) and 3. When applied to a non-absorbent substrate each blend provided a clear tough film.

Similar films were provided when the polyisocyanate dispersions were blended with polyhydroxyl group-containing polyester, and simple polyols such as 1,2,6-hexane triol.

What we claim is:

1. A coating composition which comprises a blend of:
   (1) a dispersion in an organic liquid comprising a major proportion of aliphatic hydrocarbon of particles of an adduct or prepolymer of an aliphatic or aromatic di- or triisocyanate insoluble in the organic liquid, the dispersion being stabilized by a polymeric stabilizer, one component of which is soluble in the organic liquid and another component of which is soluble in the disperse particles, each component having a molecular weight of at least 500, and the ratio of the total molecular weights of the individual components of the two types being in the range 3:1 to 1:3, and
   (2) a solution in a solvent comprising a major proportion of aliphatic hydrocarbon of a material containing groups selected from hydroxyl, primary and secondary amino, carboxyl and mercapto-groups which are reactive with the isocyanate groups contained in or yielded by the dispersion (1).

2. A coating composition according to claim 1 wherein the prepolymer or adduct is obtained by partially reacting a di- or triisocyanate with a hydroxyl group-containing compound.

3. A coating composition according to claim 1 wherein the polymeric stabilizer is a block or graft copolymer.

4. A coating composition according to claim 1 wherein each component of the polymeric stabilizer has a molecular weight of at least 1000.

5. A coating composition according to claim 1 wherein each component of the polymeric stabilizer is of the same or similar chemical type to the organic liquid or disperse particles respectively in which it is to be soluble.

6. A coating composition according to claim 1 wherein the component soluble in the disperse particles of di- or triisocyanate comprises an isocyanate-containing moiety.

7. A coating composition according to claim 1 wherein the component soluble in the organic liquid is aliphatic in character.

8. A coating composition according to claim 1 wherein there is present 1–10% by weight of stabilizer based on the weight of the dispersed particles of di- or triisocyanate.

9. A coating composition according to claim 8 wherein there is present 2–5% by weight of stabilizer based on the weight of the dispersed particles of di- or triisocyanate.

10. A coating composition according to claim 1 wherein the material containing groups reactive with isocyanate groups is selected from an aliphatic polyol, a polyhydroxyl group-containing polyester of an oil-modified alkyd resin.

11. A coating composition according to claim 1 wherein the relative proportions of the di- or triisocyanate and the material containing isocyanate-reactive groups are such that the NCO:isocyanate-reactive group molar ratio lies within the range 1:1 to 1:5.

12. A coating composition according to claim 11 wherein the molar ratio lies within the range 1:1 to 0.7:1.

13. A coating composition according to claim 1 which contains a catalyst for the reaction between isocyanate groups and groups reactive therewith.

* * * * *